(12) United States Patent
Preisser et al.

(10) Patent No.: US 6,802,964 B2
(45) Date of Patent: Oct. 12, 2004

(54) TIPPING PIT WATER RECLAIMING SYSTEM

(76) Inventors: Mark Preisser, 1605 Opal Rd., Kearney, MO (US) 64060; Robert J. Fox, 11817 County Highway A, Kiel, WI (US) 53042

( * ) Notice: Subject to any disclaimer, the term of this patent is extended or adjusted under 35 U.S.C. 154(b) by 153 days.

(21) Appl. No.: 10/299,828

(22) Filed: Nov. 20, 2002

(65) Prior Publication Data

US 2004/0094462 A1 May 20, 2004

(51) Int. Cl.⁷ .............................................. B01D 21/00
(52) U.S. Cl. ..................... 210/172; 210/532.1; 209/451; 209/464
(58) Field of Search ............................ 210/172, 532.1, 210/803, 805; 209/451, 464; 241/24.12

(56) References Cited

U.S. PATENT DOCUMENTS 6,325,311 B1  12/2001  Preisser

2002/0092799 A1 * 7/2002 Storruste ................... 209/460
2004/0040916 A1 * 3/2004 Ruppert ..................... 210/805

FOREIGN PATENT DOCUMENTS

GB          2 249 975 A      5/1992

* cited by examiner

Primary Examiner—Robert A. Hopkins
(74) Attorney, Agent, or Firm—Richard C. Litman (57) ABSTRACT

A tipping pit water reclaiming system for concrete reclaimers which includes one or more tanks with a pivot support and hydraulic pistons for tipping the tanks to remove the settled solids. Clarified water from the tipping tanks overflows into a pump tank where it is returned by pump to the reclaimer. The pump tank includes a second pump for pumping excess clarified water into a storage tank for return to the tipping tank after the cement solids have been emptied out of the tipping tank. The second pump prevents the overflowing of water onto the ground from the tipping tank or pump tank as solids accumulate in the tipping tank. The second pump is controlled by float activated switches positioned at predetermined levels within the pump tank.

20 Claims, 7 Drawing Sheets

TIPPING PIT WATER RECLAIMING SYSTEM

BACKGROUND OF THE INVENTION

1. Field of the Invention

The present invention relates to an above ground slurry water clarification system, and more particularly to a tipping pit water reclaiming system for clarifying cement slurry water discharged from concrete reclaimers.

2. Description of the Related Art

The tradition method of cement slurry water clarification for a concrete reclaiming apparatus involves the use of two to four below-ground pits. See FIGS. 2 and 3 illustrating a two pit system and a four pit system, respectively, are shown.

Figure 2:
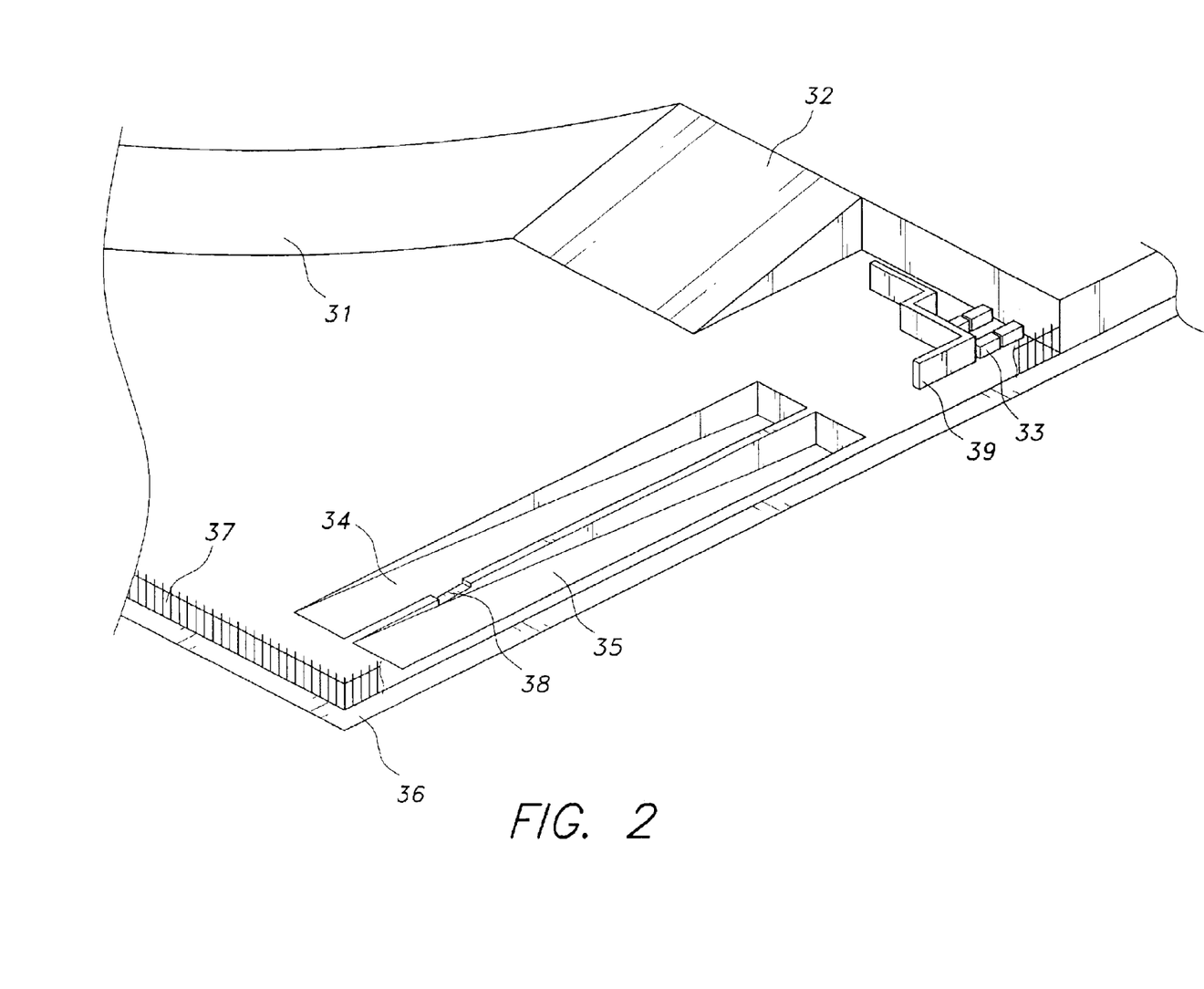
FIG. 2 is an environmental perspective view of a typical prior art in-ground/below grade concrete pit system having two pits.
Figure 3:
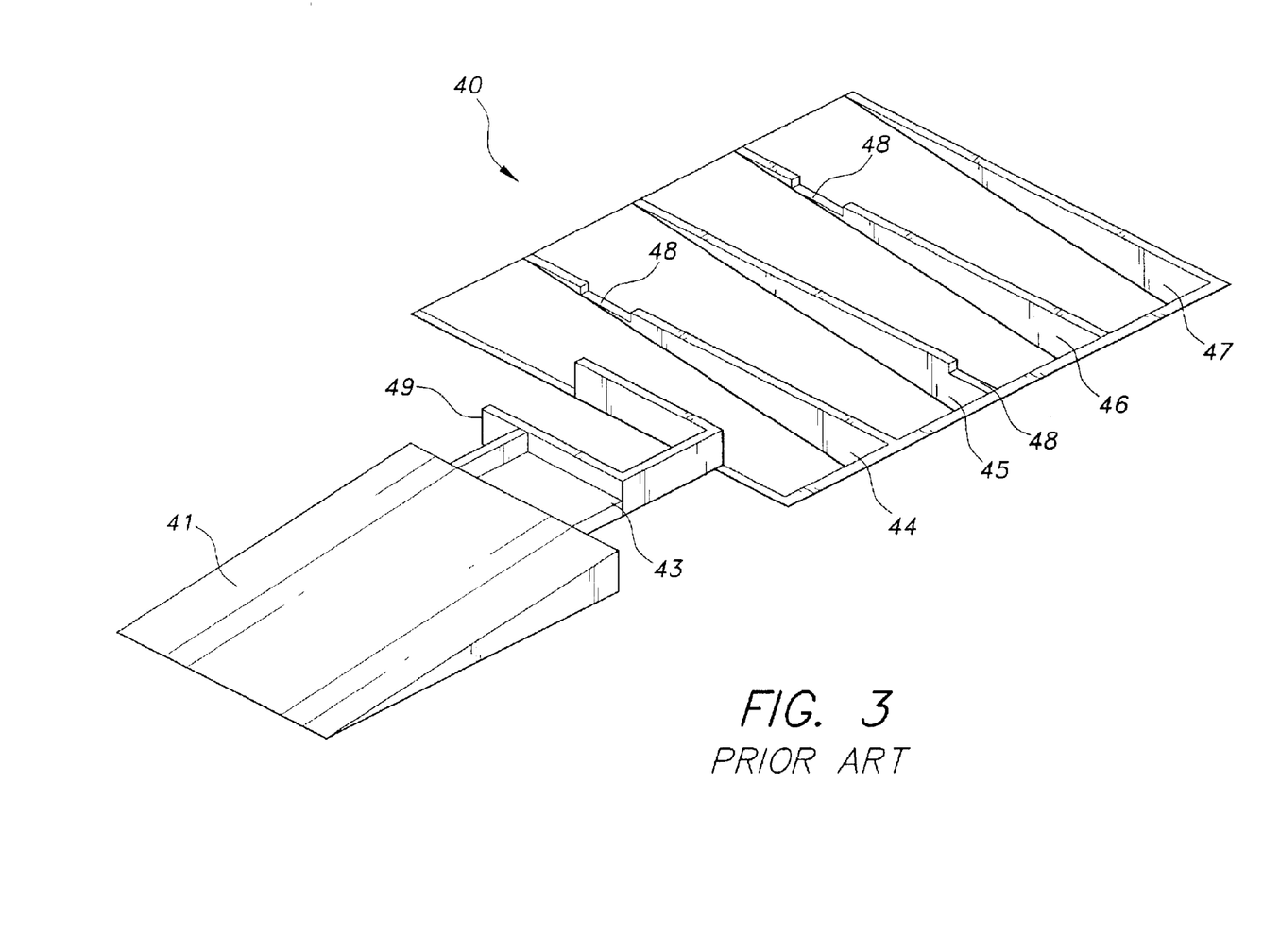
FIG. 3 is an environmental perspective view of a prior art in-ground/below grade concrete system having a series of four pits.
Figure 4:
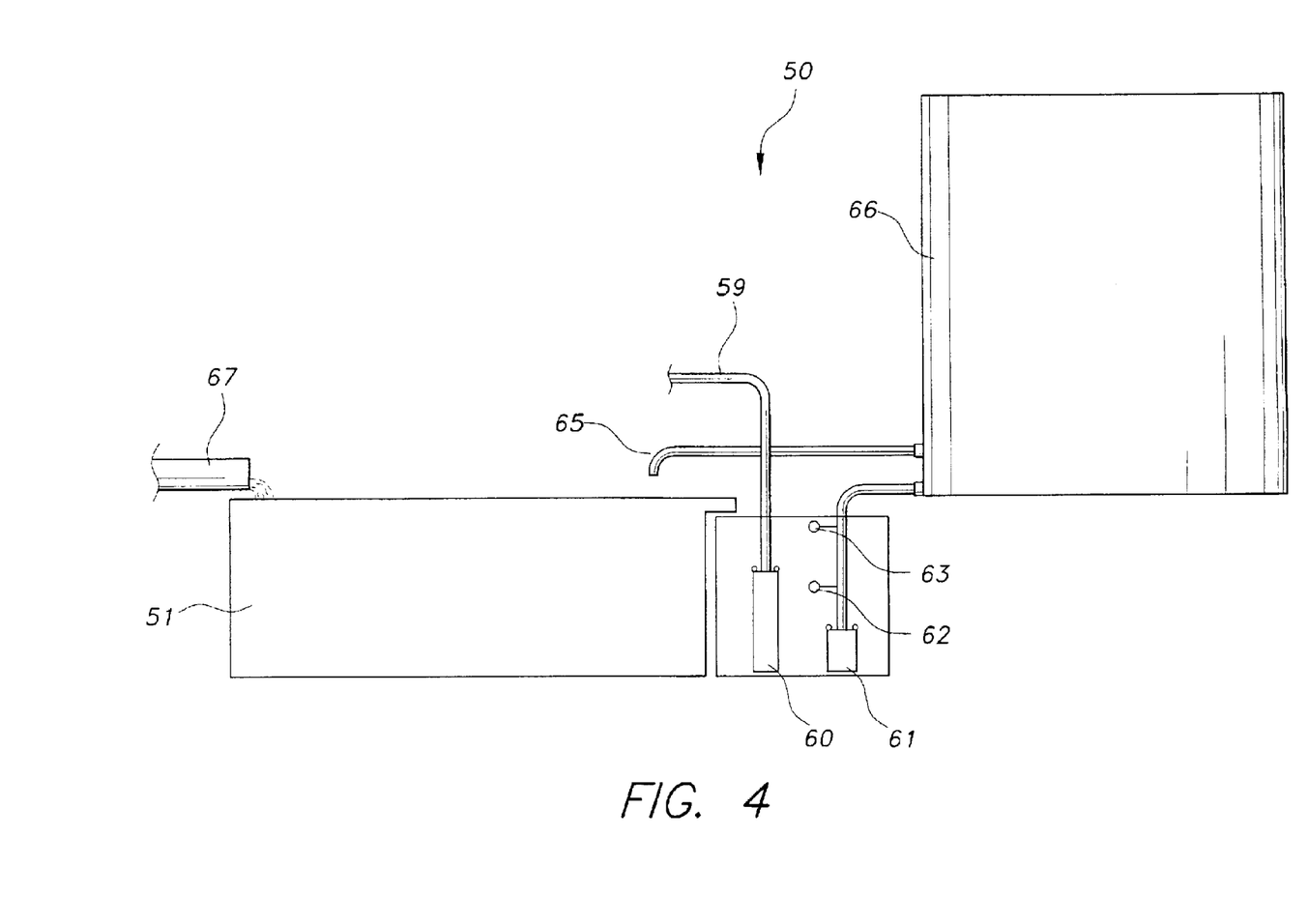
FIG. 4 is a side view of the tipping pit water reclaiming system.

As can be seen from viewing FIGS. 2 and 3, the pits require lots of space. In FIG. 2, a two pit system 30 is shown in a site having a retaining wall 31 and a ramp 32 for truck access. A wall 39 is shown in front of support blocks 33 for a reclaimer (not shown).

Pits 34 and 35 are separated by a wall with recess serving as a wier 38 between the two pits. Slurry water is channeled through the pits to allow the cement solids to settle out before being pumped out and returned to the reclaimer for reuse. A sidewalk is provided around the site and a fence is shown for keeping out unauthorized personnel. FIG. 3 shows a pit system 40 having four pits 44–47 separated by wiers 48. A wall 49 is shown adjacent the reclaimer foundation 43 and a ramp for truck access to the reclaimer is provided.

Numerous problems are associated with returning clarified water to concrete reclaiming apparatus by the in-ground pit method. For example, because the pits are below grade and full of high alkaline water they have to be secured to prevent access by unauthorized personnel who may be injured by alkaline burns or drowned in the pits. Pits are permanent and require lots of space. Cement solids tend to liquefy and tend to damage the equipment required to remove the solids from the pits. In addition, since the pits are below grade they also present the possibility of contamination of the ground water in the area of the pit should any leaks occur. The costs for building permits, security and obtaining and cleaning required equipment (i.e. a loader for removing the settled solids from the pits) are clearly disadvantages in using the concrete pit systems.

U.K. Patent Application No. 2,249,975A of Dymott published May 27, 1992 shows a device for reclaiming aggregate from waste concrete. A container is divided by partitions into a washing tank, a settling tank and a drain tank. Coarse and fine aggregates are settled out and a slurry of cement and fine aggregates are discharged from the drain tank. The aggregates that settle in the tanks are removed by tipping the entire container using hydraulic pistons. The aggregate reclaiming system of Dymott does not provide for the separation of solids out of the cement slurry for de-watering and easy removal. The Dymott system also has the disadvantage of not reclaiming the water for subsequent reuse.

In U.S. Pat. No. 4,127,487 issued Nov. 28, 1978 to Miller, a machine for salvaging waste concrete material is taught which separates aggregates and sand from the concrete mix. The cement and waste water are discharged into an above ground settling tank from which clarified water is pumped back to the machine for reuse.

None of the above inventions and patents, taken either singularly or in combination, is seen to describe the instant invention as claimed. Thus a tipable pit water reclaiming system for concrete reclaimers solving the aforementioned problems is desired.

SUMMARY OF THE INVENTION

The present invention provides an above ground cement slurry water clarification system for separating cement solids out of slurry water discharged from a concrete reclaimer and returning clarified water to the concrete reclaimer for reuse. The system includes one or more tanks with a pivot support and hydraulic pistons for tipping the tanks to remove the settled solids.

Clarified water from the tipping tank overflows into a pump tank where it is returned to the reclaimer. The pump tank includes a second pump for pumping excess clarified water into a storage tank for return to the tipping tank after the cement solids have been emptied out of the tipping tank.

The second pump is controlled by float activated switches positioned at predetermined levels within the pump tank. The second pump prevents the overflowing of water onto the ground from the tipping or pump tank as solids accumulate in the tipping tank. Accordingly, it is a principal object of the invention to provide an above ground slurry water clarification system for separating cement solids out of slurry water discharged from a concrete reclaimer and returning clarified water to the concrete reclaimer for reuse.

It is another object of the invention to provide a tipable pit pit water reclaiming system that is above grade and suitable for temporary use.

It is a further object of the invention to provide a tipable pit water reclaiming system for concrete reclaimers that decreases the possibility of contamination of the ground water in the area of the pit Still another object of the invention is to provide a tipable pit water reclaiming system for concrete reclaimers that separates solids out of a cement slurry for de-watering and easy removal and further reclaims the water for subsequent use by the concrete reclaimer.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention The present invention is an above ground slurry water clarification system for separating cement solids out of slurry water discharged from a concrete reclaimer.

Figure 1:
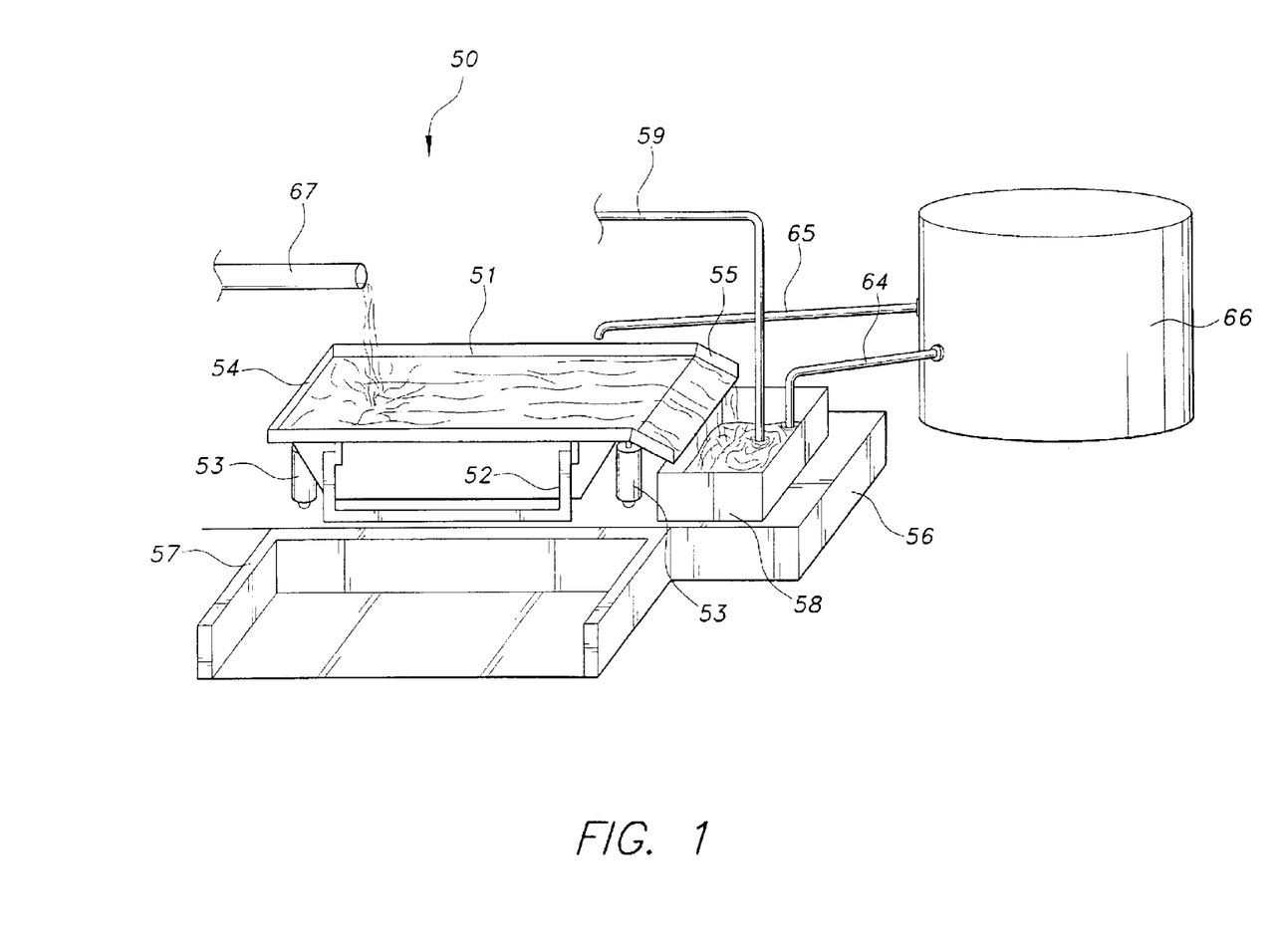
FIG. 1 is an environmental, perspective view of a tipping pit water reclaiming system according to the present invention.

FIG. 1 illustrates an above ground installation of a tipable pit water reclaiming system 50. System 50 is shown in position for clarifying cement slurry water discharged from an outlet 67 of a concrete reclaimer (not shown) and returning clarified water to the concrete reclaimer for reuse in the concrete aggregate reclaiming process.

The system 50 includes a tipping tank 51 in the form of an elongated container having a substantially rectangular opening, a rectangular bottom wall smaller than the opening and trapezoidal end and side walls attached to each other and to said bottom wall, one end of said tank being formed for receiving and containing cement slurry discharged from a concrete reclaimer and a second end of said tank being formed with an extended recessed lip forming a weir and channel for discharging clarified water.

The receiving end 54 of the tipping tank 51 is positioned near the reclaimer outlet 67. The discharge end 55 of tipping tank 51 is positioned for discharging water clarified in the tipping tank 51 into a pump tank 58.

The pump tank 58 is fitted with a pump 60 designed to pump clarified water through a conduit 59 back to the reclaimer at some predetermined rate. A second pump 61 is also fitted within the pump tank 58 that is designed to pump water into a storage tank 66 through a conduit 64. Water in storage tank 66 is released by manual activation of a control valve through a conduit 65 to refill the tipping tank 51.

Settled cement solids accumulate in the tipping tank during the clarifying process and displace the clarified water into the pump tank 58. As the level of accumulated solids increases, the flow of displaced water increases causing the level of water in the pump tank 58 to increase proportionally.

Float actuated switches are positioned within the pump tank 58 at predetermined levels to maintain proper level in the pump tank by controlling actuation of the second pump 61. Switch 62 is positioned for turning on the second pump 58 when the level of water in the pump tank 58 reaches a predetermined high level. Switch 63 is positioned for turning the second pump 61 of when the level of water in the pump tank 58 reaches a predetermined low level.

Pump 61 prevents the overflowing of water onto the ground from the tipping tank 51 or the pump tank 58. The activation of second pump 61 notifies an operator to position the tipping tank 51 into a discharge position to empty the settled cement solids into the bunker 57 for de-watering and safe removal.

Figures 5, 6:
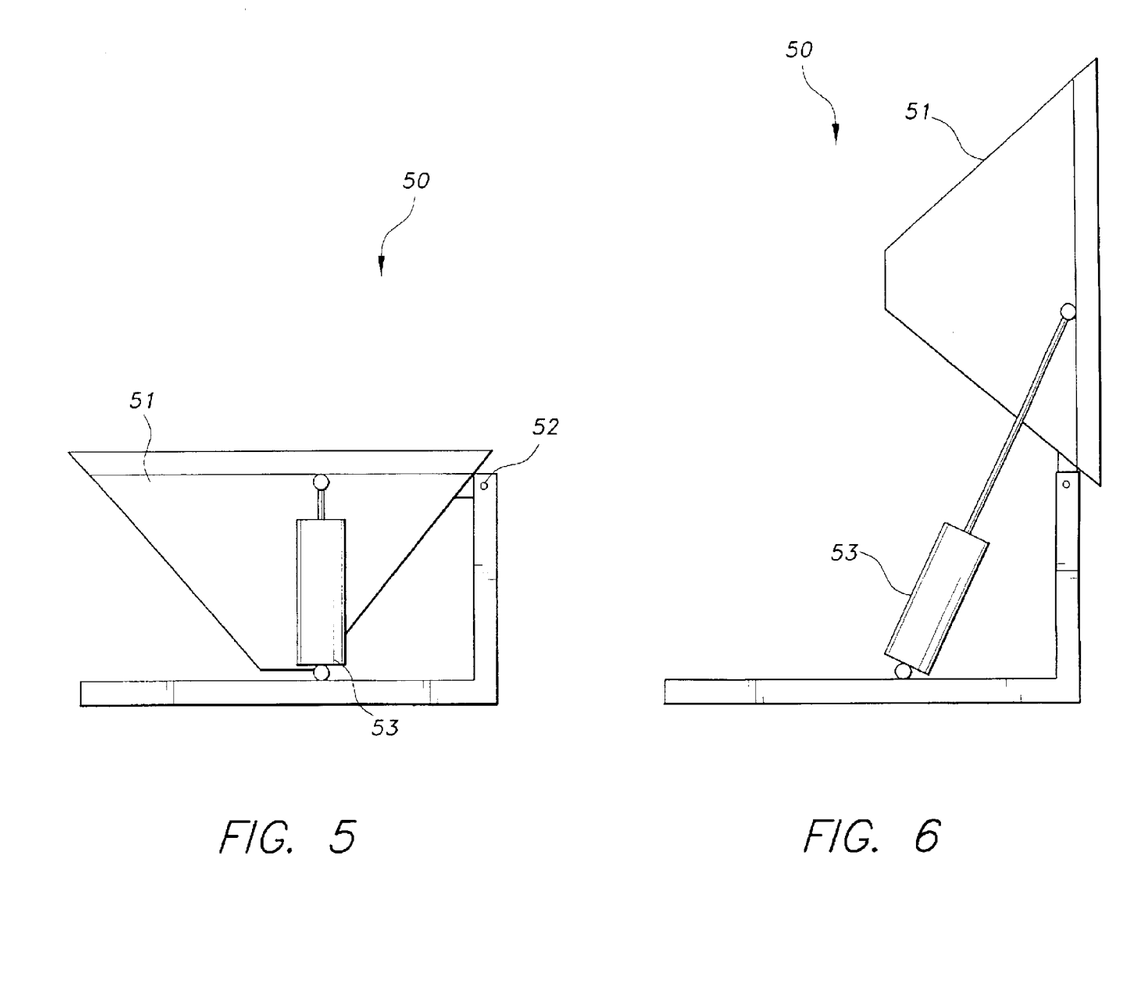
FIG. 5 is an end view of the tipping pit in a normal operating position.
FIG. 6 is a end view of the tipping pit in a discharge position.

Both tanks are firmly supported on a solid foundation 56. The tipping tank 51 is pivotally supported by a support bracket secured to the foundation 56. A motor driven hydraulic pump (not shown) is connected to a pair of hydraulic cylinders through a valve body (not shown) Hydraulic cylinders 53 are operatively connected between the pivot assembly 52 and the tipping tank 51 for causing the tipping tank 51 to pivot from the operative position shown in FIG. 5 to the discharge position as shown in FIG. 6. In the discharge position, the cement solids are deposited onto a de-watering bunker 57 positioned adjacent foundation 56. After de-watering the solids are safely removable for disposal.

Clarified water from the tipping tank 51 overflows into a pump tank 58 for return to the reclaimer. A first pump 60 positioned within the pump tank 58 pumps clarified water from the pump tank 58 through a first conduit 59 back to the reclaimer. The pump tank 58 includes a second pump 63 for pumping excess clarified water through a second conduit 64 into a storage tank 66 for subsequent return to the tipping tank 51 after the cement solids have been emptied out of the tipping tank 51 via a third conduit 65 and a manually controlled valve (not shown).

The second pump 63 is controlled by float activated switches positioned at predetermined levels within the pump tank 58 The second pump 63 prevents the overflowing of water onto the ground from the tipping tank 51 or pump tank 58 as solids accumulate in the tipping tank.

Figure 7:
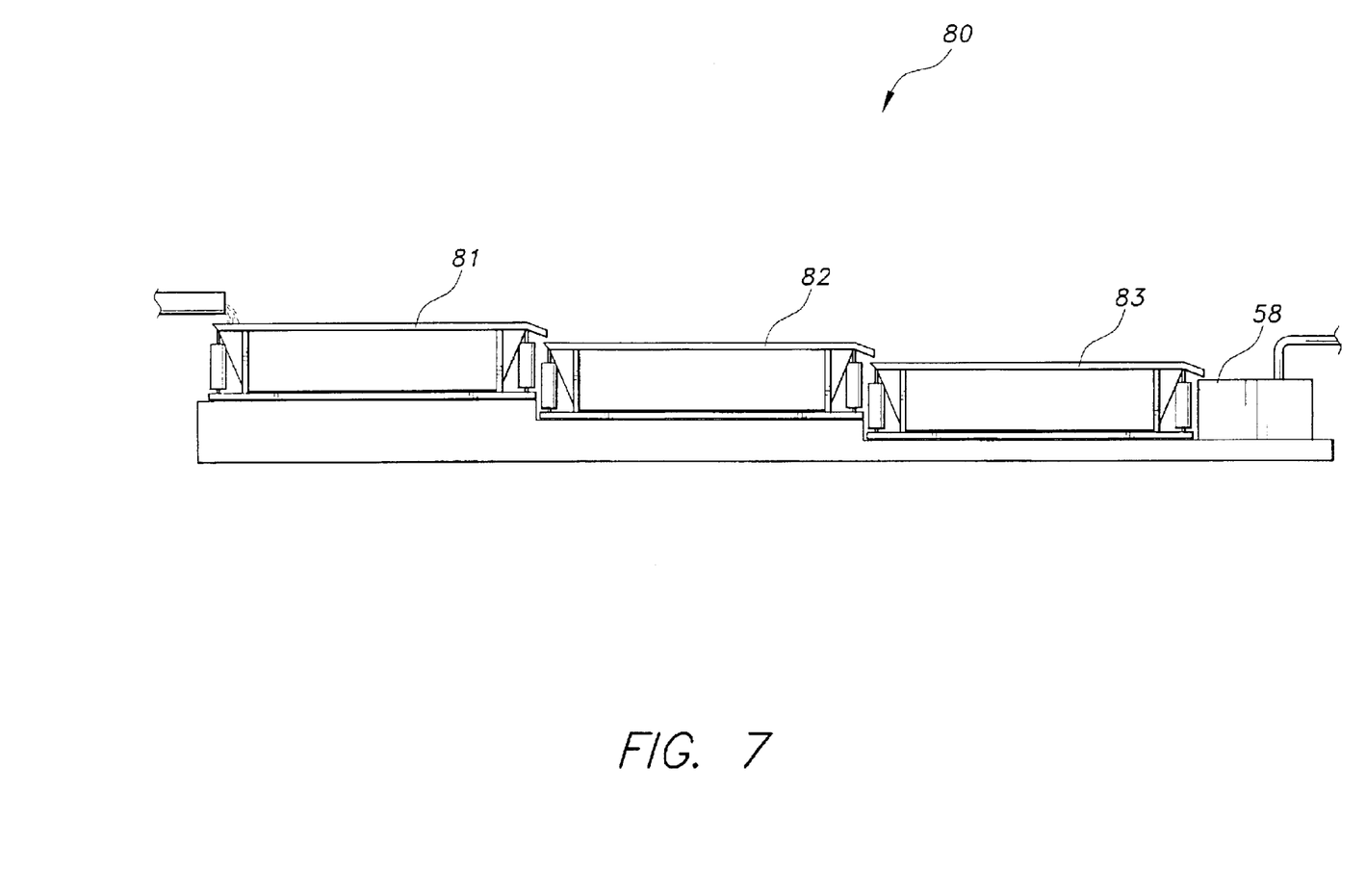
FIG. 7 is a side view of a tipping pit water reclaiming system having a series of three tipping pits.

The system 50 can be modified to compensate for increase in slurry water volume by adding additional tipping tanks operatively aligned to sequentially receive the discharged clarified water of one tank and discharge clarified water into another tank. This modified system 80 is shown in FIG. 7, wherein tipping tanks 81–83 are positioned on a stepped foundation.

Figure 8:
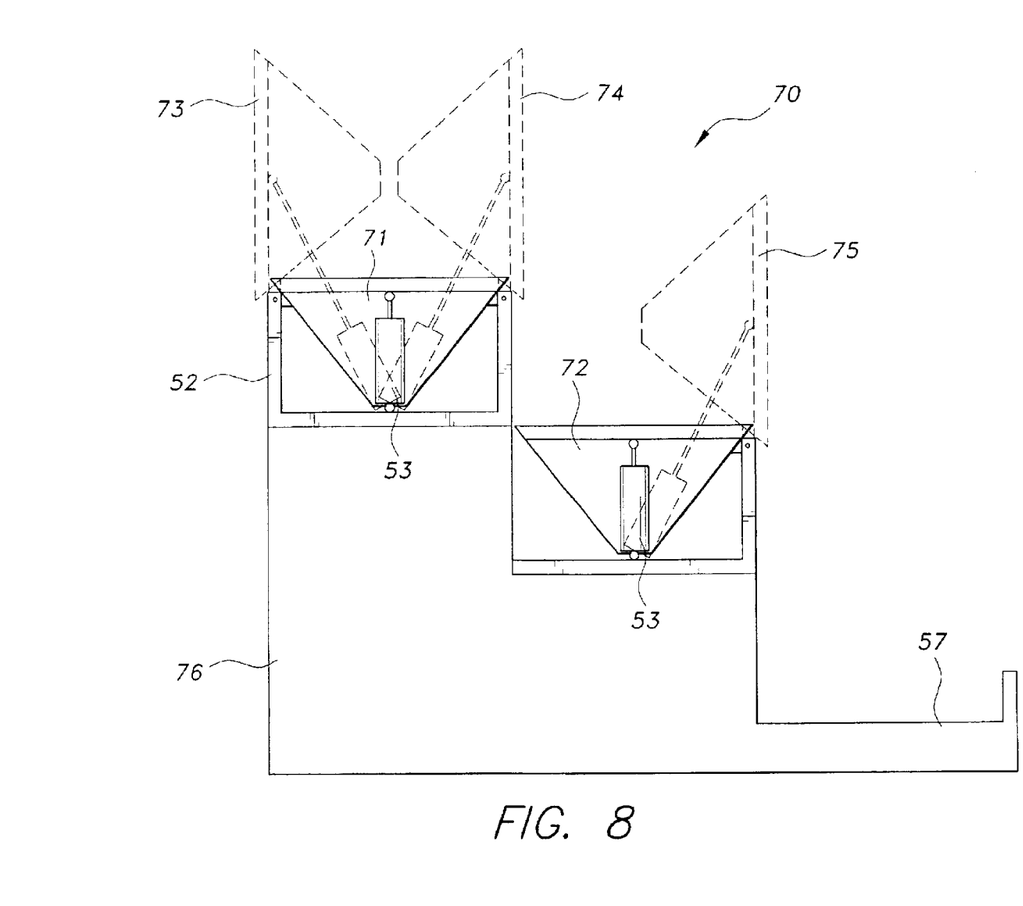
FIG. 8 is an end view of a tipping pit water reclaiming system having two tipping tanks wherein the content of an upper tank can be emptied into a lower tank.

A modified system 70 is shown in FIG. 8. A tipping tank 71 is positioned on a stepped foundation 76 for pivoting into a discharge position 73 to empty cement solids for immediate disposal or pivoting into a discharge position 74 to empty cement solids into a second tipping tank 72 on a lower step portion of the foundation. The second tipping tank 72 can be pivoted into a discharge position 75 to empty cement solids into a dewatering bunker 57. It is to be understood that the present invention is not limited to the embodiments described above, but encompasses any and all embodiments within the scope of the following claims.

We claim:

1. A tipping pit water reclaiming system for concrete reclaimers comprising:

a tipping tank for settling solids out a cement slurry;

a support bracket for pivotally supporting said tank on a concrete foundation;

a pair of hydraulicly controlled pistons operatively connected to the support bracket and the ends of said tipping tank for pivotally moving said tipping tank back and forth from a position for receiving cement slurry from a concrete reclaimer and a position for discharging solids that settled in said tank;

a pump tank positioned on said foundation for receiving clarified water from the tipping tank;

a storage tank;

a first pump operatively positioned within said pump tank for pumping clarified water through a first conduit back to the concrete reclaimer; and a second pump operatively positioned within said pump tank for pumping excess clarified water through a second conduit into said storage tank for return through a third conduit under control of a manually actuated valve to the tipping tank after the cement solids have been emptied out of the tipping tank.

2. The tipping pit water reclaiming system according to claim 1, wherein said tank is in the form of an elongated container having a substantially rectangular opening, a rectangular bottom wall smaller than the opening and trapezoidal end and side walls attached to each other and to said bottom wall.

3. The tipping pit water reclaiming system according to claim 1, wherein one end of said tank is formed for receiving and containing cement slurry discharged from a concrete reclaimer and a second end of said tank is formed with an extended recessed lip forming a weir and channel for discharging clarified water.

4. The tipping pit water reclaiming system according to claim 2, wherein one end of said tank is formed for receiving and containing cement slurry discharged from a concrete reclaimer and a second end of said tank is formed with an extended recessed lip forming a weir and channel for discharging clarified water.

5. The tipping pit water reclaiming system according to claim 1, further comprising float activated switches positioned at predetermined levels within the pump tank for controlling said second pump to maintain proper level in said pump tank and prevent the overflowing of clarified water onto the ground from the tipping tank or pump tank as solids accumulate in the tipping tank.

6. The tipping pit water reclaiming system according to claim 2, further comprising float activated switches positioned at predetermined levels within the pump tank for controlling said second pump to maintain proper level in said pump tank and prevent the overflowing of clarified water onto the ground from the tipping tank or pump tank as solids accumulate in the tipping tank.

7. The tipping pit water reclaiming system according to claim 3, further comprising float activated switches positioned at predetermined levels within the pump tank for controlling said second pump to maintain proper level in said pump tank and prevent the overflowing of clarified water onto the ground from the tipping tank or pump tank as solids accumulate in the tipping tank.

8. The tipping pit water reclaiming system according to claim 4, further comprising float activated switches positioned at predetermined levels within the pump tank for controlling said second pump to maintain proper level in said pump tank and prevent the overflowing of clarified water onto the ground from the tipping tank or pump tank as solids accumulate in the tipping tank.

9. The tipping pit water reclaiming system of claim 1, further including a de-watering bunker positioned beside said foundation for receiving settled solids discharged from said tipping tank.

10. The tipping pit water reclaiming system of claim 2, further including a de-watering bunker positioned beside said foundation for receiving settled solids discharged from said tipping tank.

11. The tipping pit water reclaiming system of claim 3, further including a de-watering bunker positioned beside said foundation for receiving settled solids discharged from said tipping tank.

12. The tipping pit water reclaiming system of claim 4, further including a de-watering bunker positioned beside said foundation for receiving settled solids discharged from said tipping tank.

13. The tipping pit water reclaiming system of claim 5, further including a de-watering bunker positioned beside said foundation for receiving settled solids discharged from said tipping tank.

14. The tipping pit water reclaiming system of claim 6, further including a de-watering bunker positioned beside said foundation for receiving settled solids discharged from said tipping tank.

15. The tipping pit water reclaiming system of claim 7, further including a de-watering bunker positioned beside said foundation for receiving settled solids discharged from said tipping tank.

16. The tipping pit water reclaiming system of claim 8, further including a de-watering bunker positioned beside said foundation for receiving settled solids discharged from said tipping tank.

17. A tipping pit water reclaiming system for concrete reclaimers comprising:
   a tipping tank for settling solids out a cement slurry;
   a support bracket for pivotally supporting said tank on a concrete foundation;
   means connected to the support bracket and the ends of said tipping tank for pivotally moving said tipping tank back and forth from a position for receiving cement slurry from a concrete reclaimer and a position for discharging solids that settled in said tank;
   a pump tank positioned on said foundation for receiving clarified water from the tipping tank;
   a storage tank;
   first pump means for pumping clarified water back to the concrete reclaimer; and
   second pump means for pumping excess clarified water into said storage tank for return through a third conduit under control of a manually actuated valve to the tipping tank after the cement solids have been emptied out of the tipping tank.

18. The tipping pit water reclaiming system according to claim 17, wherein said tank is in the form of an elongated container having a substantially rectangular opening, a rectangular bottom wall smaller than the opening and trapezoidal end and side walls attached to each other and to said bottom wall.

19. The tipping pit water reclaiming system according to claim 18, further comprising float activated switches positioned at predetermined levels within the pump tank for controlling said second pump means to maintain proper level in said pump tank and prevent the overflowing of clarified water onto the ground from the tipping tank or pump tank as solids accumulate in the tipping tank.

20. The tipping pit water reclaiming system of claim 19, further including a de-watering bunker positioned beside said foundation for receiving settled solids discharged from said tipping tank.

* * * * *